(12) United States Patent
Hayakawa et al.

(10) Patent No.: US 10,569,724 B2
(45) Date of Patent: Feb. 25, 2020

(54) COMPOSITE CABLE AND WIRE HARNESS

(71) Applicant: Hitachi Metals, Ltd., Tokyo (JP)

(72) Inventors: Yoshikazu Hayakawa, Tokyo (JP); Tomoyuki Murayama, Tokyo (JP); Hiroyuki Ito, Tokyo (JP); Hirotaka Eshima, Tokyo (JP); Takahiro Futatsumori, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/262,296

(22) Filed: Jan. 30, 2019

(65) Prior Publication Data
US 2019/0248308 A1   Aug. 15, 2019

(30) Foreign Application Priority Data

Feb. 13, 2018 (JP) .................... 2018-023586

(51) Int. Cl.
| | |
|---|---|
| *H01B 7/02* | (2006.01) |
| *B60R 16/02* | (2006.01) |
| *H01B 9/00* | (2006.01) |
| *B60R 16/03* | (2006.01) |
| *H01B 7/18* | (2006.01) |
| *H01B 7/00* | (2006.01) |

(52) U.S. Cl.
CPC .......... *B60R 16/0215* (2013.01); *B60R 16/03* (2013.01); *H01B 7/0216* (2013.01); *H01B 7/1885* (2013.01); *H01B 9/003* (2013.01); *H01B 9/006* (2013.01); *H01B 7/0009* (2013.01)

(58) Field of Classification Search
CPC .. B60R 16/0215; H60R 16/03; H01B 7/0216; H01B 9/006; H01B 7/295; H01B 11/12; H01B 11/02; H01B 5/08
USPC .................... 174/113 R, 110 R, 128.1, 128.2
See application file for complete search history.

(56) References Cited

U.S. PATENT DOCUMENTS

| | | | | |
|---|---|---|---|---|
| 4,731,506 | A | * | 3/1988 | Lee ...................... H01B 11/125 174/113 R |
| 9,000,301 | B2 | | 4/2015 | Hayakawa et al. |
| 9,463,756 | B2 | | 10/2016 | Hayakawa et al. |
| 9,862,336 | B2 | | 1/2018 | Hayakawa et al. |

(Continued)

FOREIGN PATENT DOCUMENTS

JP         5541331 B2    7/2014

*Primary Examiner* — Steven T Sawyer
(74) *Attorney, Agent, or Firm* — Roberts Mlotkowski Safran Cole & Calderon P.C.

(57) ABSTRACT

A composite cable is composed of a twisted pair formed by twisting together one pair of first electric wires each including a first conductor and a first insulation covering an outer circumference of the first conductor, one pair of second electric wires each including a second conductor greater in cross sectional area than the first conductor and a second insulation covering an outer circumference of that second conductor, the second electric wire being greater in outer diameter than the first electric wire, and a sheath covering aggregates together formed by stranding together the twisted pair and the one pair of second electric wires. The first conductors are formed by stranding a plurality of metal wires together. The second conductors are formed by stranding a plurality of aggregated strands together formed by stranding a plurality of metal wires together.

6 Claims, 3 Drawing Sheets

(56) References Cited

U.S. PATENT DOCUMENTS

| | | |
|---|---|---|
| 9,902,347 B2 | 2/2018 | Hayakawa et al. |
| 2003/0150638 A1* | 8/2003 | Patel .................... H01B 11/005 |
| | | 174/113 R |
| 2008/0060833 A1* | 3/2008 | Spruell .............. H01B 13/0228 |
| | | 174/113 R |
| 2013/0277087 A1 | 10/2013 | Hayakawa et al. |
| 2014/0190741 A1* | 7/2014 | Hayakawa .......... B60R 16/0207 |
| | | 174/72 A |
| 2014/0326480 A1* | 11/2014 | Hashimoto ............ H01B 7/295 |
| | | 174/113 R |
| 2015/0144375 A1* | 5/2015 | Hashimoto .......... H01B 7/0009 |
| | | 174/113 R |
| 2015/0165987 A1 | 6/2015 | Hayakawa et al. |
| 2015/0165988 A1 | 6/2015 | Hayakawa et al. |
| 2016/0176369 A1* | 6/2016 | Ito ........................ B60R 16/023 |
| | | 174/72 A |
| 2016/0339854 A1 | 11/2016 | Hayakawa et al. |
| 2018/0134239 A1 | 5/2018 | Hayakawa et al. |

\* cited by examiner

COMPOSITE CABLE AND WIRE HARNESS

CROSS-REFERENCE TO RELATED APPLICATION

The present application is based on Japanese patent application No. 2018-023586 filed on Feb. 13, 2018, the entire contents of which are incorporated herein by reference.

BACKGROUND OF THE INVENTION OF THE INVENTION

1. Field of the Invention

The present invention relates to a composite cable and a wire harness, and more particularly to a composite cable and a wire harness for connecting a wheel side and a vehicle body side together in a vehicle such as an automobile.

2. Description of the Related Art

In recent years, electrically driven braking devices have been used in vehicles such as automobiles. As the electrically driven braking devices, an electro-mechanical brake (EMB) and an electric parking brake (EPB) are known.

The electromechanical brake is also simply referred to as an electrically driven brake or an electric brake, and is configured to control the rotational driving force of dedicated electric motors provided in each wheel of the vehicle in accordance with the operation amount (pedal effort or displacement amount) of the brake pedal by the driver, with pistons driven by the electric motors to press brake pads against disc rotors of the wheels, and thereby generate a braking force according to the intention of the driver.

The electric parking brake is configured in such a manner that after stopping the vehicle the driver operates a parking brake actuating switch, to drive dedicated electric motors provided in each wheel of the vehicle, with pistons driven by the electric motors to press brake pads against disc rotors of the wheels, and thereby generate a braking force.

Also, in a recent vehicle, its wheels are often mounted with sensors such as an ABS (Anti-lock Brake System) sensor for detecting the rotational speed of the running wheels, an air pressure sensor for detecting the air pressure of the tires, a temperature sensor and the like.

Therefore, a composite cable that accommodates in a common sheath a signal line for the sensors mounted on the wheels or a signal line for controlling the electromechanical brake, and a power supply line that supplies electric power to the electric motors for the electromechanical brake or the electric parking brake, is used to connect the wheel side and the vehicle body side together (see Japanese Patent No. 5541331).

SUMMARY OF THE INVENTION

In the vehicle, it may be necessary to greatly bend the composite cable for convenience of a routing layout, so sufficient bending resistance is required for the composite cable. To improve the bending resistance, however, it is not preferable from the viewpoint of manufacturing cost that the manufacturing process of the composite cable becomes complicated.

Accordingly, it is an object of the present invention to provide a composite cable and a wire harness which are easy to manufacture while maintaining the bending resistance thereof.

In order to solve the above-described problem, the present invention provides a composite cable, comprising: a twisted pair formed by twisting together one pair of first electric wires each including a first conductor and a first insulation covering an outer circumference of the first conductor; one pair of second electric wires each including a second conductor greater in cross sectional area than the first conductor and a second insulation covering an outer circumference of that second conductor, the second electric wire being greater in outer diameter than the first electric wire; and a sheath covering aggregates together formed by stranding together the twisted pair and the one pair of second electric wires, wherein the first conductors are formed by stranding a plurality of metal wires together, wherein the second conductors are formed by stranding a plurality of aggregated strands together formed by stranding a plurality of metal wires together.

In addition, in order to solve the above-mentioned problem, the present invention provides a wire harness, comprising: the above mentioned composite cable, and a connector attached to at least one of ends of the first electric wires and the second electric wires.

POINTS OF THE INVENTION

According to the present invention, it is possible to provide the composite cable and the wire harness which are easy to manufacture while maintaining the bending resistance thereof.

DETAILED DESCRIPTION OF THE PREFERRED EMBODIMENTS

[Embodiment]

An embodiment of the present invention will be described below with reference to the accompanying drawings.

(Explanation of a Vehicle to which a Composite Cable is Applied)

Figure 1:
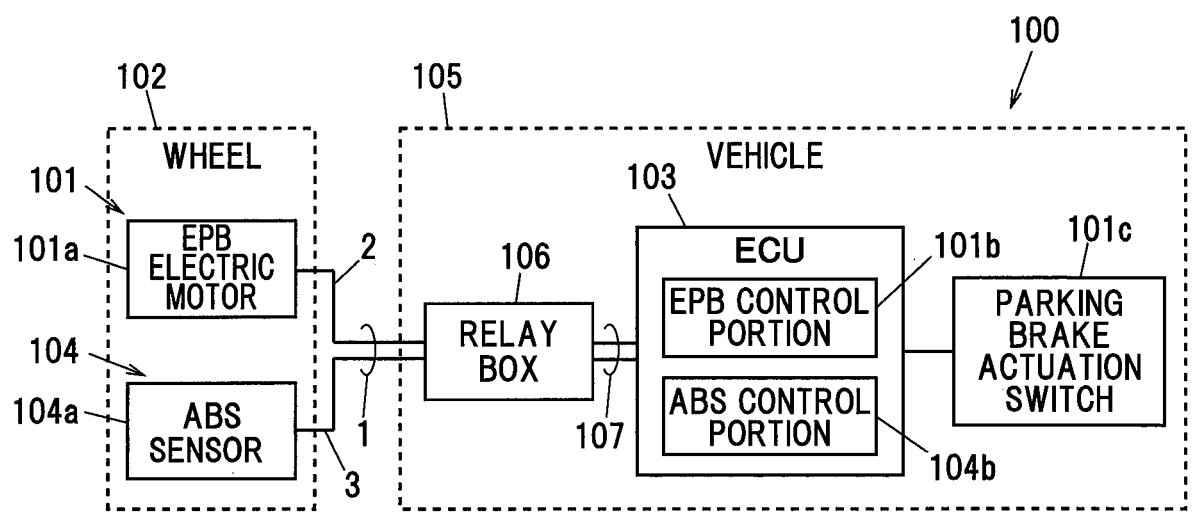
FIG. 1 is a block diagram showing a configuration of a vehicle using a composite cable according to one embodiment of the present invention.

FIG. 1 is a block diagram showing a configuration of a vehicle using a composite cable according to the present embodiment.

As shown in FIG. 1, the vehicle 100 is provided with an electric parking brake (hereinafter referred to as "EPB") 101 as an electrically driven braking device.

The EPB 101 includes an EPB electric motor 101a and an EPB control portion 101b.

The EPB electric motor 101a is mounted in a wheel 102 of the vehicle 100. The EPB control portion 101b is mounted in an ECU (electronic control unit) 103 of the vehicle 100. Note that the EPB control portion 101b may be mounted in a control unit other than the ECU 103 or may be mounted in a dedicated hardware unit.

The EPB electric motor 101a is provided with a piston (not shown) to which a brake pad is attached, so that it is configured to move that piston by the rotational drive of the EPB electric motor 101a to thereby press the brake pad against the wheel disc rotor of the wheel 102 to generate a braking force. One pair of second electric wires 2 are connected to the EPB electric motor 101a as a power supply line for supplying a drive current to the EPB electric motor 101a.

The EPB control portion 101b is configured to, when the parking brake actuation switch 101c is operated from the OFF state to the ON state at the time of stopping of the vehicle 100, output a driving current to the EPB electric motor 101a for a predetermined time (e.g., one second), thereby pressing the brake pad against the disc rotor of the wheel 102 and generating a braking force to the wheel 102. Also, the EPB control portion 101b is configured to, when the parking brake actuation switch 101c is operated from the ON state to the OFF state or when the accelerator pedal is depressed, output a drive current to the EPB electric motor 101a to release the brake pad from the disc rotor of the wheel to release the braking force to the wheel 102. That is, the operating state of the EPB 101 is configured to be maintained from the time the parking brake actuating switch 101c is turned on until the parking brake actuating switch 101c is turned off or the accelerator pedal is depressed. Note that the parking brake actuation switch 101c may be a lever type or pedal type switch.

The vehicle 100 is also mounted with an ABS device 104. The ABS device 104 includes an ABS sensor 104a and an ABS control portion 104b.

The ABS sensor 104a is for detecting the rotation speed of the running wheel 102, and is mounted in the wheel 102. The ABS control portion 104b is for controlling the braking device based on the output of the ABS sensor 104a to control the braking force of the wheel 102 so that the wheel 102 is not locked at the time of abrupt stopping, and is mounted in the ECU 103. One pair of first electric wires 3 are connected to the ABS sensor 104a as a signal line.

Figure 2A:
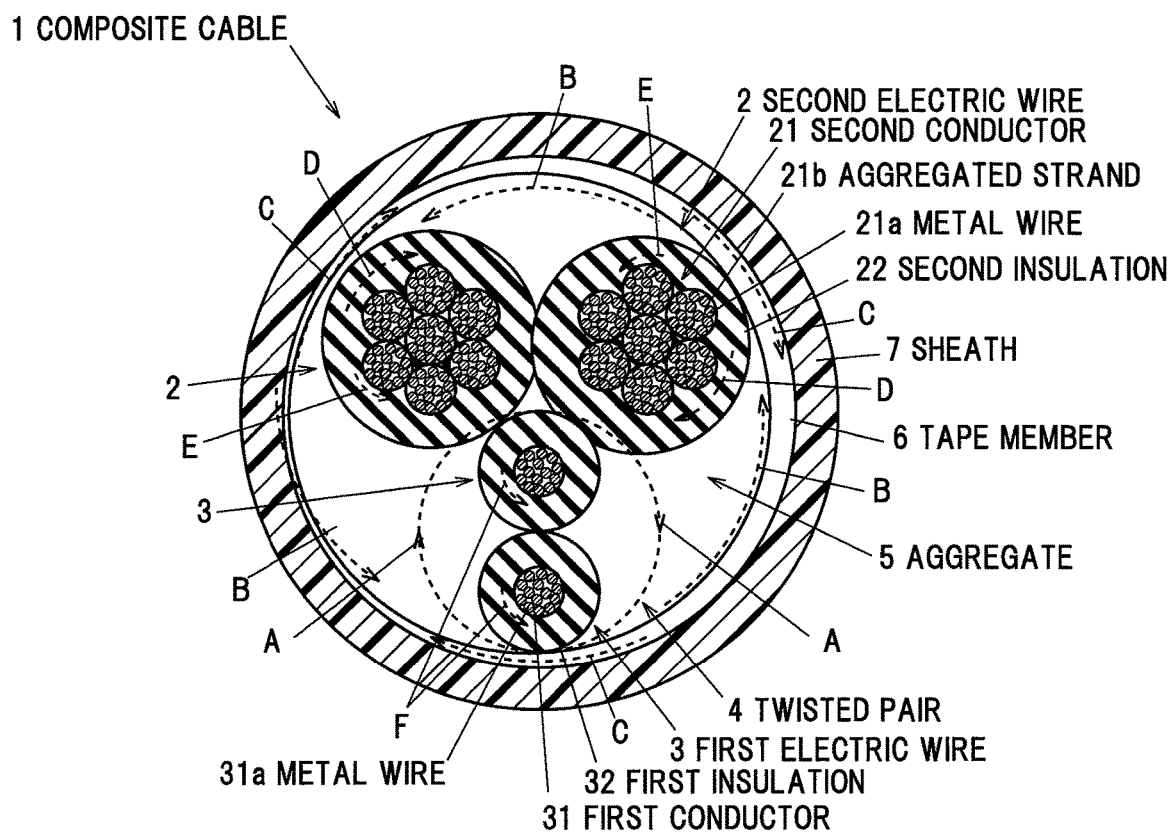
FIG. 2A is a transverse cross-sectional view of the composite cable according to one embodiment of the present invention.

In the composite cable 1 according to the present embodiment, the first electric wires 3 and the second electric wires 2 together are covered with a sheath 7 (see FIG. 2A). The composite cable 1 extended from the wheel 102 side is connected to an electric wire group 107 in a relay box 106 provided in a vehicle body 105 and is connected to the ECU 103 and a battery (not shown) via the electric wire group 107.

Although only one wheel 102 is shown in FIG. 1 for the sake of simplicity, the EPB electric motor 101a and the ABS sensor 104a may be mounted in each wheel 102 of the vehicle 100. For example, they may be mounted only in the front wheels of the vehicle 100 or only in the rear wheels of the vehicle 100.

(Description of Composite Cable 1)

Figure 2B:
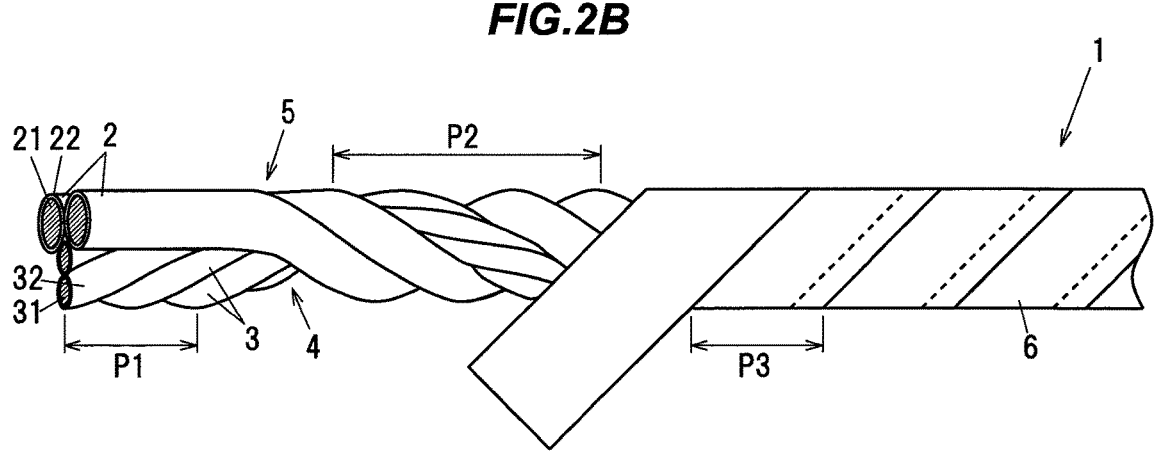
FIG. 2B is a diagram for explaining a stranding direction of a first electric wire and a second electric wire in the composite cable and a wrapping direction of a tape member.

FIG. 2A is a transverse cross-sectional view of the composite cable 1 according to the present embodiment, and FIG. 2B is a diagram for explaining a stranding direction of the first electric wires 3 and the second electric wires 2 and a wrapping direction of a tape member 6.

As shown in FIGS. 2A and 2B, the composite cable 1 includes a twisted pair 4 formed by twisting together one pair of first electric wires 3 each including a first conductor 31 and a first insulation 32 covering an outer circumference of the first conductor 31; one pair of second electric wires 2 each including a second conductor 21 greater in cross sectional area than the first conductor 31 and a second insulation 22 covering an outer circumference of that second conductor 21, the second electric wire 2 being greater in outer diameter than the first electric wire 3; and a sheath 7 covering aggregates 5 together formed by stranding together the twisted pair 4 and the one pair of second electric wires 2.

In the present embodiment, the composite cable 1 is provided with the tape member 6 wrapped helically around the aggregates 5, and the sheath 7 is provided so as to circumferentially cover the tape member 6.

In the present embodiment, the first electric wires 3 are configured as a signal line for the ABS sensor 104a mounted in the wheel 102. Also, the second electric wires 2 are configured as a power supply line for supplying a drive current to the electric motor 101a for the EPB 101 mounted in the wheel 102 of the vehicle 100.

Now, in the present embodiment, the first conductors 31 are formed by stranding a plurality of metal wires 31a together, and the second conductors 21 are formed by stranding a plurality of aggregated strands 21b together formed by stranding a plurality of metal wires 21a together. The stranded form in which the aggregated strands 21b once stranded together are again stranded together like the second conductors 21 is called "composite stranding".

As the metal wires 21a and 31a, ones made of copper or a copper alloy can be used. Further, the surfaces of the metal wires 21a and 31a may be plated with tin, nickel, silver, zinc or the like. As the metal wires 21a and 31a, those having a diameter of 0.05 mm or more and 0.30 mm or less can be used. If the metal wires 21a and 31a having a diameter of less than 0.05 mm are used, no sufficient mechanical strength can be obtained and the bending resistance may deteriorate, and if the metal wires 21a and 31a having diameters greater than 0.30 mm are used, the flexibility of the composite cable 1 may lower.

The metal wires 31a used for the first conductors 31 and the metal wires 21a used for the second conductors 21 may be the same or different. For example, it is also possible to use the metal wires 21a made of inexpensive copper for the second conductors 21 which has a relatively large conductor cross-sectional area and which is resistant to tension, and use the metal wires 31a made of a copper alloy having a high tensile strength though slightly high in cost, or the metal wires 31a having an outer diameter larger than that of the metal wires 21a, for the first conductors 31 having a relatively small conductor cross-sectional area and being weak against tension. Note that in the case where the more resistance to bending is required, the metal wires 21a used for the second conductors 21, which are made of a copper alloy, may also be used.

(First Electric Wires 3, Twisted Pair 4)

In the present embodiment, the first conductors 31 are formed by aggregate stranding a plurality of metal wires 31a together. The aggregate stranding is a form of stranding in which a plurality of metal wires 31a are randomly bundled and stranded together. As another form of stranding of this aggregate stranding, there is also a form of stranding called concentric stranding in which one metal wire 31a is disposed at the center and metal wires 31a are helically stranded together around the metal wire 31a arranged at the center. In the concentric stranding, since the metal wires 31a are geometrically and regularly arranged, the number of the metal wires 31a is limited (is, e.g., 7, 19, etc.), which is time-consuming to manufacture as compared with the aggregate stranding. Therefore, the aggregate stranding of the first conductors 31 facilitates the manufacturing, allowing cost lowering, as compared with the case of concentric stranding. However, for example, when it is desired that the appearance of the first electric wires 3 be favorable, the first conductors 31 may be formed by concentric stranding which is likely to form a circular shape with a good cross section shape.

The outer diameters of the first electric wires 3 are smaller than the outer diameters of the second electric wires 2. In the present embodiment, in order to strand the twisted pair 4 formed by twisting the one pair (two) of first electric wires 3 and the one pair of second electric wires 2 together, it is preferable to use the first electric wires 3 having an outer diameter of the order of half the outer diameter of the second electric wires 2 from the viewpoint of bringing the outer diameter of the composite cable 1 closer to a circular shape. Specifically, as the first electric wires 3, ones having an outer diameter of 1.0 mm or more and 1.8 mm or less and outer diameters of the first conductors 31 of 0.4 mm or more and 1.3 mm or less can be used. The first insulations 32 are made of an insulating resin such as a crosslinked polyethylene.

The twist pitch P1 of the twisted pair 4 is preferably set in consideration of the outer diameters of the first electric wires 3 so that no unnecessary load is applied to the first electric wires 3. Here, the twist pitch P1 of the twisted pair 4 is set at about 30 mm, but the twist pitch P1 of the twisted pair 4 is not limited thereto. Note that the twist pitch P1 of the twisted pair 4 is a distance along the longitudinal direction of the twisted pair 4 where any first electric wire 3 is at the same position in the circumferential direction of the twisted pair 4.

(Second Electric Wires 2)

In the present embodiment, the aggregated strands 21b used for the second conductors 21 are formed by aggregate stranding a plurality (for example, 10 to 100) of the metal wires 21a together. This is because, as described above, as compared with the case of concentric stranding, manufacturing becomes easier and cost reduction becomes possible. Since the aggregated strands 21b are further stranded together to form the second conductors 2, even if the cross-sectional shapes of the aggregated strands 21b fluctuate slightly, its influence is small and the inexpensive aggregate stranding is desirable.

Furthermore, in the present embodiment, the second conductors 2 are formed by concentrically stranding a plurality of aggregated strands 21b together. This makes it possible to obtain the second conductors 2 whose sectional shapes of the second conductors 2 are close to a circular shape and to suppress variations in the circumferential direction in the thicknesses of the second insulations 22. For example, it is possible to suppress the problem that it is difficult to bend in a specific direction. Since the conductor diameters of the second conductors 2 (the overall outer diameters of the second conductors 2) are large and when the stranding becomes unstable, the influence on the bending durability and the like becomes large, the concentric stranding rather than the aggregate stranding is desirable.

The outer diameters of the second conductors 21 of the second electric wires 2 and the thicknesses of the second insulations 22 may be appropriately set according to the magnitude of the required driving current. In the present embodiment, considering that the second electric wires 2 are a power supply line for supplying a drive current to the electric motor 101a for the EPB 101, the outer diameters of the second conductors 21 are set at 1.5 mm or more and 3.0 mm or less, and the outer diameters of the second electric wires 2 are set at 2.0 mm or more and 4.0 mm or less. The second insulations 22 are made of an insulating resin such as a crosslinked polyethylene.

The outer diameter of the aggregated strands 21b is, for example, 0.4 mm or more and 1.3 mm or less. The aggregated strands 21b and the first conductors 31 may be the same. Thus, the number of parts can be reduced and the cost can be reduced. Further, even in the case where the aggregated strands 21b and the first conductors 31 are made different from each other, by making the outer diameters of the aggregated strands 21b and the first conductors 31 substantially equal, it becomes possible to manufacture using the same strand manufacturing apparatus, which contributes to cost reduction.

(Aggregates 5)

The aggregates 5 are formed by stranding the one pair of the second electric wires 2 and the twisted pair 4 together. In the present embodiment, the one pair of second electric wires 2 are brought into contact with each other, and the one pair of third electric wires 3 are brought into contact with each other, and the one pair of second electric wires 2 and third electric wires 3 are brought into contact with each other, to form the aggregates 5. At this time, at least a part of the first electric wires 3 is disposed in the valley between the one pair of second electric wires 2.

Furthermore, in the present embodiment, a plurality of filamentous (fibrous) inclusions (not shown) extending in the longitudinal direction of the composite cable 1 are disposed between the one pair of second electric wires 2 and the twisted pair 4 and the tape member 6, and then stranded together with the second electric wires 2 and the twisted pair 4, whereby the aggregates 5 are constituted. Therefore, the stranding direction and the stranding pitch of the plurality of inclusions are the same as the stranding direction and the stranding pitch of the aggregates 5. The plurality of inclusions are arranged so as to fill in the gaps between the one pair of second electric wires 2 and the twisted pair 4 and the tape member 6, so that the cross-sectional shape when the tape member 6 is wrapped around the outer circumference of the aggregates 5 is close to a more circular shape. Note that a part of the plurality of inclusions may also be arranged in the valley between the one pair of second electric wires 2 and the valley between the one pair of first electric wires 3.

As the inclusions, fibrous bodies such as polypropylene yarns, spun yarns (rayon staple fibers), aramid fibers, nylon fibers, fiber type plastics and the like, a linear body, paper, or cotton yarn having a circular cross section formed by resin molding (extrusion molding or the like) of a polymer material such as polyethylene (PE) or polyethylene terephthalate (PET) can be used. Also, in the transverse cross sectional view of FIG. 2A, the cross-sectional area of the inclusions is preferably smaller than the cross-sectional area of the second electric wires 2 and the cross-sectional area of the first electric wires 3.

The EPB 101 basically supplies a drive current to the electric motor 101a when the vehicle is stopped. On the other hand, the ABS sensor 104a is used when the vehicle is traveling, and the ABS sensor 104a is never used when a driving current is supplied to the second electric wires 2. Therefore, in this embodiment, a shield conductor provided around the twisted pair 4 is omitted. By omitting the shield conductor, the outer diameter of the composite cable 1 can be made smaller as compared with the case where the shield conductor is provided, and also the cost can be suppressed by reducing the number of parts.

Note that although the case where the second electric wires 2 supply the electric current to the EPB electric motor 101a is described here, the second electric wires 2 may be used, for example, to supply a driving current to an electric motor of an electromechanical brake (hereinafter referred to as EMB) provided in the wheel 102. In this case, since current flows in the second electric wires 2 even while the vehicle 100 is running, it is desirable to provide a shield conductor around the twisted pair 4 in order to suppress malfunction of the ABS device 104 due to noise.

Further, although the case where the first electric wires 3 are a signal line for the ABS sensor 104a has been described herein, the first electric wires 3 may be a signal line used for another sensor provided in the wheel 102, for example, a temperature sensor, an air pressure sensor for detecting the air pressure of the tire, or the like, a damper wire used for controlling the vibration damping device of the vehicle 100 or a signal line (CAN cable or the like) for EMB control. Even when the second electric wires 2 are for supplying driving current to the EPB electric motor 101a, when the first electric wires 3 are used while the vehicle 100 is stopped, in order to suppress malfunction due to noise, it is desirable to provide the shield conductor around the twisted pair 4.

The outer diameter of the entire aggregates 5 is, for example, on the order of 5 mm to 9 mm. The stranding pitch P2 of the aggregates 5 is preferably set at such an extent that no unnecessary load is applied to the second electric wires 2 and the twisted pair 4 in consideration of the outer diameter of the aggregates 5. Here, the stranding pitch P2 of the aggregates 5 is set at about 60 mm, but the stranding pitch P2 of the aggregates 5 is not limited thereto. Note that the stranding pitch P2 of the aggregates 5 is a distance along the longitudinal direction of the aggregates 5 where any second electric wire 2 or twisted pair 4 is at the same position in the circumferential direction of the aggregates 5.

(Tape Member 6)

The tape member 6 is helically wrapped around aggregates 5, and the tape member 6 is in contact with the one pair of the second electric wires 2 and the twisted pair 4. The tape member 6 is interposed between the aggregates 5 and the sheath 7 and acts to reduce the friction between the aggregates 5 (the electric wires 2 and 3) and the sheath 7 when bent. That is, by providing the tape member 6, it is possible to reduce the friction between the electric wires 2 and 3 and the sheath 7 without using a lubricant such as talc powder or the like, reduce the stress applied to the electric wires 2 and 3 at the time of bending, and improve the bending resistance. Further, when covered with the sheath 7, the tape member 6 also acts to suppress the resin constituting the sheath 7 from entering around the second electric wires 2 and the twisted pair 4, and facilitate termination (stripping) to remove the sheath 7.

As the tape member 6, it is preferable to use a slippery one (having a small friction coefficient) with respect to the first insulations 32 of the first electric wires 3 and the second insulations 22 of the second electric wires 2, and for example, nonwoven fabric, paper, or resin (resin film or the like) can be used. More specifically, as the tape member 6, it is preferable to use a member whose coefficients of friction (static friction coefficients) between the tape member 6 and the insulations 22 and 32 are smaller than the friction coefficients (static friction coefficients) between the sheath 7 and the insulations 22 and 32 when no tape member 6 is provided.

Note that as the tape member 6, one having a laminated structure of two or more layers can also be used. In this case, the surface of the tape member 6 in contact with the aggregates 5 may be made of any one of nonwoven fabric, paper, and resin layer. For example, a configuration may be used in which a resin layer is formed on one side of paper as the tape member 6, and a resin layer having a smaller friction coefficient may be wrapped around aggregates 5 side. The tape member 6 is helically wrapped around the aggregates 5 so that it is partially overlapped in its width direction (the direction perpendicular to the longitudinal direction and the thickness direction of the tape member 6). The width of overlapping of the tape member 6 is, for example, ¼ or more and ½ or less of the width of the tape member 6.

The width of the tape member 6 may be set at a width to the extent that no wrinkle gets on the tape member 6 when the tape member 6 is wrapped, and it is desirable to use the tape member 6 having a smaller width as the outer diameter of the entire aggregates 5 becomes smaller. Specifically, when the outer diameter of the aggregates 5 is 5 mm to 9 mm, the width of the tape member 6 may be on the order of 20 mm to 50 mm. The wrapping pitch P3 of the tape member 6, that is, the distance (for example, the distance between one end portions in the width direction) along which the tape member 6 is at the same circumferential position depends on the width and overlapping width of the tape member 6 (the wrapping angle of the tape member 6), and in this case is on the order of 40 mm at the maximum. Here, the wrapping pitch P3 of the tape member 6 is set at about 30 mm, but the wrapping pitch P3 of the tape member 6 is not limited thereto.

Note that when the width of the tape member 6 is increased and the wrapping pitch P3 is increased, the tape member 6 is substantially longitudinally wrapped, so the flexibility of the composite cable 1 is lost and it becomes difficult to bend. Therefore, the wrapping pitch P3 of the tape member 6 is desirably set at 40 mm or less.

(Sheath 7)

The sheath 7 is provided around the tape member 6. The sheath 7 is made of e.g. urethane resin. In the present embodiment, since the second electric wires 2 is for supplying a driving current to the EPB electric motor 101a, and the time during which the driving electric current flows in the second electric wires 2 is relatively short, the shield conductor covering the aggregates 5 is omitted, but a shield conductor may be appropriately provided according to the applications or the like of the second electric wires 2. In the case of providing a shield conductor, it is preferable to wrap a protective tape member around the aggregates 5 to prevent damage to the insulations 22 and 32 caused by contact with the shield conductor, and to provide a shield conductor therearound. The outer circumference of the shield conductor may be provided with the tape member 6 and the sheath 7 described above in order.

(Stranding Direction of Each Member, Wrapping Direction of the Tape Member 6)

It is preferable that a stranding direction of the aggregated strands 21b and a stranding direction of the second conductors 21 are different. Note that here, the stranding direction refers to a direction in which when the composite cable 1 is viewed from the tip side (the left side in FIG. 2B, the side where the overlap of the tape member 6 is on the upper side), the conductors 21 and 31 and the electric wires 2 and 3 are rotated from the base end side to the tip side. The stranding direction of the aggregated strands 21b is the direction of stranding together the plurality of metal wires 21a and the stranding direction of the second conductors 21 is the direction of stranding together the plurality of aggregated strands 21b. In FIG. 2A, the stranding direction of the aggregated strands 21 b is indicated by a broken line arrow E, and the stranding direction of the second conductors 21 is indicated by a broken line arrow D. In the cross section of FIG. 2A, the stranding direction of the aggregated strands 21b is counterclockwise and the stranding direction of the second conductors 21 is clockwise.

Generally, stranding electric wires or metal wires or winding a tape in a helical shape causes a bending tendency depending on the stranding direction and winding direction, and naturally curves the entire cable. As in the present embodiment, by making the stranding direction of the aggregated strands 21b different from the stranding direction of the second conductors 21, the bending tendency of the aggregated strands 21b and the bending tendency of the second conductors 21 cancel each other out in opposite directions, so it is possible to easily realize the linear second electric wires 2 with the suppressed bending tendencies. As a result, the stranding when the aggregates 5 are stranded together is stabilized, and the composite cable 1 can be stably manufactured.

Note that if the stranding pitch of the aggregated strands 21b is too large, the stranding of the aggregated strands 21b may loosen when stranding together the second conductors 21. Therefore, it is desirable that the stranding pitch of the aggregated strands 21b is at least smaller than the stranding pitch of the second conductors 21. That is, when the stranding direction of the aggregated strands 21b is different from the stranding direction of the second conductors 21, by setting the stranding pitch of the aggregated strands 21b to be smaller than the stranding pitch of the second conductors 21, the stranding pitch of the aggregated strands 21b is less liable to collapse, and the cross-sectional shape of the second conductors 21 can be stabilized. Note that the stranding pitch of the aggregated strands 21b is a distance along the longitudinal direction of the aggregated strands 21b in which any metal strand 21a is at the same position in the circumferential direction of the aggregated strands 21b. Further, the stranding pitch of the second conductors 21 is a distance along the longitudinal direction of the second conductors 21 where any aggregated strand 21b (excluding that arranged at the center) is at the same position in the circumferential direction of the second conductors 21.

Further, it is preferable that the stranding direction of the second conductors 21 and the stranding direction of the aggregates 5 are different from each other. As a result, the bending tendency of the second conductors 21 and the bending tendency of the aggregates 5 are opposite to each other, cancel each other out, and it is possible to easily realize the linear aggregates 5 in which the bending tendency is suppressed. Note that the stranding direction of the aggregates 5 is the direction in which the one pair of second electric wires 2 and the twisted pair 4 are stranded together. In FIG. 2A, the stranding direction of the aggregates 5 is indicated by a broken line arrow B. In the cross section of FIG. 2A, the stranding direction of the second conductors 21 is clockwise, and the stranding direction of the aggregates 5 is counterclockwise.

Similarly, it is desirable that a twisting direction of the twisted pair 4 and a stranding direction of the aggregates 5 are different. As a result, the bending tendency of the twisted pair 4 and the bending tendency of the aggregates 5 are opposite to each other, cancel each other out, and it is possible to easily realize the linear aggregates 5 in which the bending tendency is suppressed. Note that the stranding direction of the twisted pair 4 is the direction in which the one pair of first electric wires 3 are stranded together. In FIG. 2A, the stranding direction of the twisted pair 4 is indicated by a broken line arrow A. In the cross section of FIG. 2A, the stranding direction of the twisted pair 4 is clockwise, and the stranding direction of the aggregates 5 is counterclockwise. The stranding direction of the twisted pair 4 and the stranding direction of the second conductors 21 are the same directions.

For example, when the twisting direction of the twisted pair 4 and the stranding direction of the aggregates 5 are the same direction, the twisted pair 4 is twisted in the direction in which the twist is tightened when stranding together the aggregates 5 and the twisting pitch P1 of the twisted pair 4 may change. By making the twisting direction of the twisted pair 4 different from the stranding direction of the aggregates 5, it becomes possible to form the aggregates 5 while maintaining the twisting pitch P1 of the twisted pair 4. Note that if the twisting pitch P1 of the twisted pair 4 is too large, the twist of the twisted pair 4 may loosen when stranding together aggregates 5. Therefore, it is desirable that the twisting pitch P1 of the twisted pair 4 is at least smaller than the stranding pitch P2 of the aggregates 5. That is, when the twisting direction of the twisted pair 4 is different from the stranding direction of the aggregates 5, by setting the twisting pitch P1 of the twisted pair 4 to be smaller than the stranding pitch P2 of the aggregates 5, it becomes difficult for the twist of the twisted pair 4 to collapse and it is possible to stabilize the cross-sectional shape of the aggregates 5.

Furthermore, it is preferable that the stranding direction of the aggregates 5 is different from the wrapping direction of the tape member 6. As a result, the bending tendency of the aggregates 5 and the bending tendency caused by wrapping the tape member 6 are opposite to each other and cancel each other, and it is possible to easily realize the linear composite cable 1 in which the bending tendency is suppressed. As a result, variations in bending characteristics in the longitudinal direction of the composite cable 1 can be suppressed. It should be noted that the wrapping direction of the tape member 6 means the direction in which when the composite cable 1 is viewed from the tip side (the left side in FIG. 2B, the side where the overlap of the tape member 6 is on the upper side), the tape member 6 is rotated from the base end side to the tip side. In FIG. 2A, the wrapping direction of the tape member 6 is indicated by a dashed arrow C. In the cross section of FIG. 2A, the stranding direction of the aggregates 5 is counterclockwise and the wrapping direction of the tape member 6 is clockwise. The wrapping direction of the tape member 6 is the same as the twisting direction of the twisted pair 4 and the stranding direction of the second conductors 21.

Further, by making the stranding direction of the aggregates 5 different from the wrapping direction of the tape member 6, the tape member 6 is prevented from entering into the gap between the second electric wires 2 or the gap between the second electric wire 2 and the twisted pair 4 so that the sectional shape of the composite cable 1 can be made closer to a circular shape. As a result, it is possible to improve the appearance of the composite cable 1 and easily perform stripping for removing the sheath 7. As described above, since the bending tendency is suppressed in the composite cable 1, the stripping for removing the sheath 7 is easier.

Further, by making the stranding direction of the aggregates 5 different from the wrapping direction of the tape member 6, the direction in which aggregates 5 are likely to buckle and the direction in which the tape member 6 is likely to buckle can be made different, and for example even when twisting and bending are applied simultaneously at the same time, it is possible to realize the composite cable 1 which is difficult to buckle.

The diameter of the first conductors 31 is small, and the influence on the bending tendency and the like is relatively small. Therefore, the stranding direction of the first conductors 31 may be the same direction as the twisting direction of the twisted pair 4, or may be a different direction from the twisting direction of the twisted pair 4. The stranding direction of the first conductors 31 is a direction in which a plurality of metal wires 31a are stranded together and is indicated by a broken line arrow B in FIG. 2A. Here is shown the case where the stranding direction of the first conductors 31 is made different from the twisting direction of the twisted pair 4 in order to suppress the bending tendency of the twisted pair 4. In the cross section of FIG. 2A, the stranding direction of the first conductors 31 is counterclockwise, and the twisting direction of the twisted pair 4 is clockwise.

(Explanation of Wire Harness Using Composite Cable 1)

Figure 3:
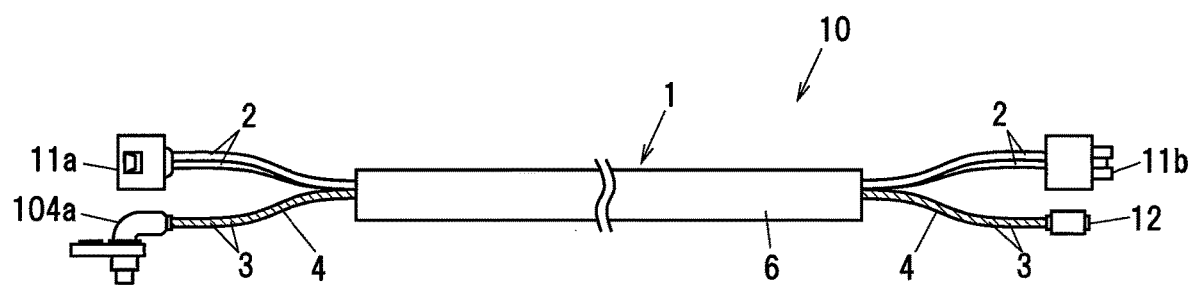
FIG. 3 is a schematic configuration diagram of a wire harness according to one embodiment of the present invention.

FIG. 3 is a schematic configuration diagram of a wire harness according to the present embodiment.

As shown in FIG. 3, the wire harness 10 is configured to include the composite cable 1 according to the present embodiment and a connector attached to at least one of end portions of the first electric wires 3 and the second electric wires 2.

In FIG. 3, the left side of the drawing shows the end on the wheel 102 side and the right side shows the end on the vehicle body 105 side (the relay box 106 side). In the following description, the end portion on the wheel 102 side of the wire harness 10 is referred to as "one end portion", and the end portion on the vehicle body 105 side (the relay box 106 side) is referred to as "the other end portion".

A wheel side power supply connector 11a for connection with the EPB electric motor 101a is attached to one end portion of the one pair of second electric wires 2, and at the other end portion of the one pair of second electric wires 2, a vehicle body side power supply connector 11b for connection with an electric wire group 107 within a relay box 106 is attached.

An ABS sensor 104a is attached to one end portion of one pair of first electric wires 3 (twisted pair 4), and at the other end portion of one pair of first electric wires 3 (twisted pair 4), a vehicle body side ABS connector 12 for connection with the electric wire group 107 within the relay box 106 is attached.

Note that although the case where the connectors are individually provided for the second electric wires 2 and the first electric wires 3 (the twisted pair 4) has been described here, a dedicated connector for connecting both the electric wires 2 and 3 together may be provided.

(Operation and Advantageous Effects of the Embodiment)

As described above, in the composite cable 1 according to the present embodiment, the first conductors 31 are formed by stranding the plurality of metal wires 31a together, and the second conductor 21 is formed by stranding together the plurality of aggregated strands 21b formed by stranding the plurality of metal wires 21a together.

By forming the second conductors 21 with a large diameter as a composite strand, the distortion at the time of bending the composite cable 1 does not concentrate, and is easy to disperse into the plurality of metal wires 21a, so it is possible to improve the bending resistance. As a result, it is possible to deal with a routing layout that bends the composite cable 1 greatly, which improves the routability.

Although it is conceivable that the first conductors 31 are also composite stranded, since the second conductors 21 having a large diameter are dominant with respect to the bending resistance, even if the first conductors 31 are composite stranded, contribution to the improvement of the bending resistance is small. Therefore, in the present embodiment, the first conductors 31 are configured as an ordinary strand so that they can be easily and inexpensively manufactured. That is, in the present embodiment, the second electric wires 2 (the second conductors 21) of a large diameter which are easily influenced by the bending are composite stranded together and the first electric wires 3 (the first electric wires 31) having a small diameter which are not easily influenced by the bending are configured as an ordinary strand which is small in the number of steps and easy to manufacture. Therefore, according to the present embodiment, it is possible to realize the composite cable 1 which is easy to manufacture while maintaining the bending resistance.

(Summary of the Embodiment)

Next, the technical ideas grasped from the above-described embodiments will be described with the aid of reference numerals and the like in the embodiments. It should be noted, however, that each of the reference numerals and the like in the following description does not limit the constituent elements in the claims to the members and the like specifically shown in the embodiments.

[1] A composite cable (1), comprising: a twisted pair (4) formed by twisting together one pair of first electric wires (3) each including a first conductor (31) and a first insulation (32) covering an outer circumference of the first conductor (31); one pair of second electric wires (2) each including a second conductor (21) greater in cross sectional area than the first conductor (31) and a second insulation (22) covering an outer circumference of that second conductor (21), the second electric wire (2) being greater in outer diameter than the first electric wire (3); and a sheath (7) covering aggregates (5) together formed by stranding together the twisted pair (4) and the one pair of second electric wires (2), wherein the first conductors (31) are formed by stranding a plurality of metal wires (31a) together, wherein the second conductors (21) are formed by stranding a plurality of aggregated strands (21b) together formed by stranding a plurality of metal wires (21a) together.

[2] The composite cable (1) according to [1] above, wherein a stranding direction of the aggregated strands (21b) and a stranding direction of the second conductors (21) are different.

[3] The composite cable (1) according to [1] or [2] above, wherein a stranding direction of the second conductors (21) and a stranding direction of the aggregates (5) are different.

[4] The composite cable (1) according to any one of [1] to [3] above, wherein a twisting direction of the twisted pair (4) and a stranding direction of the aggregates (5) are different.

[5] The composite cable (1) according to any one of [1] to [4] above, wherein the second conductors (21) are formed by concentrically stranding a plurality of the aggregated strands (21b) together.

[6] The composite cable (1) according to any one of [1] to [5] above, wherein the aggregated strands (21b) are formed by aggregate stranding a plurality of metal wires (21a) together.

[7] The composite cable (1) according to any one of [1] to [6] above, wherein the first conductors (31) are formed by aggregate stranding a plurality of metal wires (31a) together.

[8] A wire harness (10), comprising: a composite cable (1) according to any one of [1] to [7] above, and a connector attached to at least one of ends of the first electric wires (3) and the second electric wires (2).

Although the embodiment of the present invention has been described above, the embodiment described above does not limit the invention according to the claims. It should also be noted that not all combinations of the features described in the embodiments are indispensable to the means for solving the problem of the invention.

The present invention can be appropriately modified and carried out within the scope not deviating from the spirit thereof. For example, although not mentioned in the above embodiment, the twisted pair 4 (the one pair of first electric wires 3) together may be coated with an insulation.

Further, although in the above-described embodiment, the description has been given of the case where there is the one twisted pair 4, two or more twisted pairs 4 may be provided. In the case of having two twisted pairs 4, the two twisted pairs 4 and the one pair of second electric wires 2 are stranded together to form the aggregates 5. In the case of having two twisted pairs 4, it is preferable to arrange the twisted pairs 4 and the second electric wires 2 alternately in the circumferential direction of the composite cable 1. Similarly, three or more second electric wires 2 may be provided, or an electric wire different from the second electric wires 2 may be included in the aggregates 5.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A composite cable, comprising:
   a twisted pair formed by twisting together one pair of first electric wires each including a first conductor and a first insulation covering an outer circumference of the first conductor;
   one pair of second electric wires each including a second conductor greater in cross sectional area than the first conductor and a second insulation covering an outer circumference of that second conductor, the second electric wire being greater in outer diameter than the first electric wire; and
   a sheath covering aggregates together formed by stranding together the twisted pair and the one pair of second electric wires,
   wherein the first conductors are formed by stranding a plurality of metal wires together,
   wherein the second conductors are formed by stranding a plurality of aggregated strands together formed by stranding a plurality of metal wires together,
   wherein all of the aggregated strands forming the second conductor electrically contact one another, and
   wherein a stranding direction of the aggregated strands and a stranding direction of the second conductors are different,
   wherein a twisting direction of the twisted pair and a stranding direction of the aggregates are different, and
   wherein a stranding direction of the first conductor in each of the first electric wires and the twisting direction of the twisted pair are different.

2. The composite cable according to claim 1, wherein a stranding direction of the second conductors and a stranding direction of the aggregates are different.

3. The composite cable according to claim 1, wherein the second conductors are formed by concentrically stranding a plurality of the aggregated strands together.

4. The composite cable according to claim 1, wherein the aggregated strands are formed by aggregate stranding a plurality of metal wires together.

5. The composite cable according to claim 1, wherein the first conductors are formed by aggregate stranding a plurality of metal wires together.

6. A wire harness, comprising:
   a composite cable according to claim 1, and
   a connector attached to at least one of ends of the first electric wires and the second electric wires.

* * * * *